United States Patent [19]
Douglas

[11] 3,971,439
[45] July 27, 1976

[54] DESIGNING MICELLAR DISPLACEMENT SYSTEMS TO MINIMIZE ADSORPTION

[75] Inventor: Larry J. Douglas, Denver, Colo.

[73] Assignee: Marathon Oil Company, Findlay, Ohio

[22] Filed: Mar. 31, 1975

[21] Appl. No.: 563,437

[52] U.S. Cl.................................. 166/252; 166/275
[51] Int. Cl.².................. E21B 43/22; E21B 47/00; E21B 49/00
[58] Field of Search................ 166/252, 275, 305 R; 252/8.55 D

[56] References Cited
UNITED STATES PATENTS

| | | | |
|---|---|---|---|
| 3,258,072 | 6/1966 | Froning............................. | 166/275 X |
| 3,493,051 | 2/1970 | Gogarty........................... | 166/275 X |
| 3,570,602 | 3/1971 | Halbert, Jr....................... | 166/275 X |
| 3,731,741 | 5/1973 | Palmer et al..................... | 166/275 X |
| 3,825,067 | 7/1974 | Vestal.......................... | 166/305 R X |

*Primary Examiner*—Stephen J. Novosad
*Assistant Examiner*—George A. Suckfield
*Attorney, Agent, or Firm*—Joseph C. Herring; Jack L. Hummel

[57] ABSTRACT

Where a micellar displacement fluid interacts with the rock of a particular reservoir to produce a negative surface potential, the least adsorption of surfactant occurs and slug instability due to surfactant loss is minimized. Thus, micellar displacement fluid integrity can be increased by selecting slug components which produce a more negative surface potential at the fluid-rock interface compared to the surface potential of the rock formation fluids prior to injection of the micellar system.

11 Claims, 2 Drawing Figures

SURFACE POTENTIAL vs pH, MEASURED USING POTENTIOMETRIC TITRATION, FOR FOUR SANDSTONE MATERIALS.

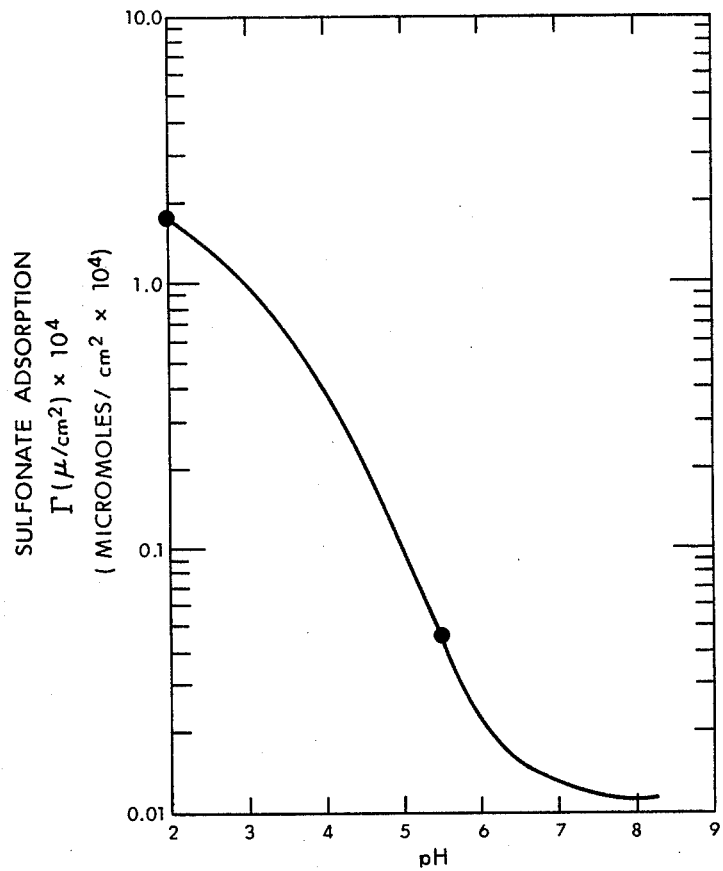
Fig. 1 ADSORPTION LEVEL vs pH FOR SYSTEM ALUMINA, MONOSULFONATE IN WATER.
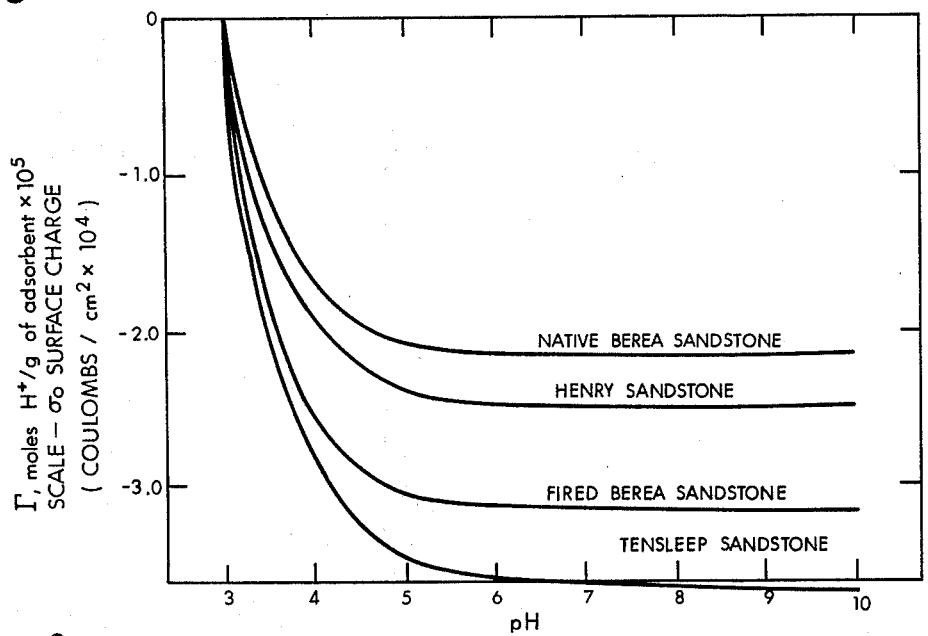
Fig. 2 SURFACE POTENTIAL vs pH, MEASURED USING POTENTIOMETRIC TITRATION, FOR FOUR SANDSTONE MATERIALS.

DESIGNING MICELLAR DISPLACEMENT SYSTEMS TO MINIMIZE ADSORPTION

BACKGROUND OF THE INVENTION

1. Field of the Invention

The present invention relates to the recovery of crude oil from oil-bearing subterranean formations through use of micellar systems.

2. Description of the Prior Art

To the best of the inventor's knowledge, no previous literature has dealt with the measurement of rock surface potential as a criteria for the design of displacement fluids for recovery of petroleum.

SUMMARY

General Statement of the Invention

According to the present invention, the surface potential of reservoir rock is measured and the quantitative and qualitative composition of the micellar systems is varied to produce increasingly higher negative values of surface potential. The invention is based on the discovery that minimum adsorption of surfactant can be achieved by providing the rock-micellar system combination having the maximum negative surface potential within the allowable limits of economy, systems viscosity, etc.

The micellar systems utilized with the invention will be either water- or oil-external, will have electrical conductivities of at least about $1 \times 10^{-5}$ ohm$^{-1}$/cm$^{-1}$ and in most cases will exhibit a pH in the range above about 9, more preferably above about 9.5, and most preferably above about 9.7.

"pH" as utilized herein with reference to micellar systems is measured by conventional apparatus such as that described in Bates, R. E., "Electrometric pH Determinations" J. Wiley & Sons, Inc., New York (1954). The pH test probe is submerged in the micellar system and the pH is read directly from the scale of the instrument.

"Electrical conductivity" as utilized herein is measured by a conventional conductivity bridge such as that described in Potter, E. C., "Electrochemistry" Cleaver-Hume Press, Ltd., London (1961).

DESCRIPTION OF THE DRAWINGS

FIG. 1 is a graph of adsorption level versus pH for alumina in contact with mono-sulfonate and water. Note the sharp decrease in adsorption with increasing pH until pH of approximately 8 is reached.

FIG. 2 is a graph of surface potential versus pH for Tensleep Sandstones; fired and unfired Berea Sandstones and Henry Formation (Illinois) Sandstone.

DESCRIPTION OF THE PREFERRED EMBODIMENTS

Micellar Dispersions: The micellar dispersions useful in this invention are composed of hydrocarbon, aqueous medium, and surfactant sufficient to impart micellar dispersion characteristics to the dispersion. In addition, cosurfactant(s) and electrolyte(s) are optionally useful in the micellar dispersion.

The term "micellar dispersion" as used herein is meant to include micellar solutions, microemulsions, oleopathic hydro-micelles, "transparent" emulsions, "fine" emulsions, and micellar solution technology taught in C. G. Sumner, Clayton's *The Theory of Emulsions and Their Technical Treatment*, Fifth Edition, pp. 315–320 (1954). The examples of useful micellar solutions include those defined in U.S. Pat. Nos. 3,254,714 to Gogarty et al; 3,275,075 to Gogarty et al; 3,301,325 to Gogarty et al; 3,307,628 to Sena, and 3,348,611 to Reisberg. The micellar dispersion of this invention can be oil-external.

Hydrocarbons: Hydrocarbons useful in the micellar dispersions include crude oil (both sweet and sour) partially refined fractions of crude oil, refined fractions thereof, and liquefied petroleum gases.

Water: The aqueous medium can be soft, brackish, or a brine. Preferably, the water is soft, but it can contain small amounts of salts which do not precipitate on contact with the ions within the subterranean formations being flooded.

Surfactants: Surfactants useful with the dispersions include both cationic and anionic surfactants. Examples of such surfactants include sodium glyceryl monolaurate sulfate, dihexyl sodium succinate, hexadecylnaphthalene sulfonate, diethyleneglycol sulfate laurate, p-chloroaniline sulfate laurate, sodium sulfato oleylethylanilide, triethanolamine myristate, N-methyltaurine oleamide, pentaerythritol monostearate, polyglycerol monolaurate, triethanolamine oleate, morpholine stearate, hexadecyl trimethylammonium chloride, ditetradecyl dimethyl ammonium chloride, n-dodecyl-diethylene-glycol sulfate, monobutylphenyl phenol sodium sulfate, and triethanolamine laurate or triethanolamine oleate. Other useful surfactants include Duponol. WAQE (a 30% active sodium lauryl sulfate marketed by DuPont Chemical Corporation, Wilmington, Del.), Energetic W-100 (a polyoxyethylene alkyl phenol marketed by Armour Chemical Company, Chicago, Ill.), Triton X-100 (an alkylphenoxy polyethoxy ethanol marketed by Rohm & Haas, Philadelphia, Pa.), and Arquad 12-50 (a 50% active dodecyl trimethyl ammonium chloride marketed by Armour Chemical Company, Chicago, Ill.), and like materials.

Petroleum sulfonates (i.e., surfactants) are also useful with the dispersion, they are also known as alkyl aryl naphthenic sulfonates. Such can be obtained by sulfonating at least a portion of a sulfonatable hydrocarbon (e.g., gas oils) and then neutralizing the mixture, e.g., with $NH_4OH$, NaOH, etc. The sulfonate can contain, after extraction, e.g., 60–100% active sulfonate. Unsulfonated hydrocarbon within the sulfonates is useful as the hydrocarbon within this invention. Examples of preferred surfactants are the sodium and ammonium petroleum sulfonates having an average molecular weight of from about 360 to about 520, and more preferably from about 420 to about 470. The sulfonate can be a mixture of low and high molecular weight sulfonates. Surfactants of like character are also useful.

Cosurfactants: The cosurfactants, also known as cosolubilizers or semipolar organic compounds, useful with this invention include alcohols, amino compounds, esters, aldehydes and ketones containing from 1 to about 20 or more carbon atoms and more preferably from about 3 to about 16 carbon atoms. The cosurfactant is preferably an alcohol, e.g., isopropanol, n- and isobutanol, the amyl alcohols such as n-amyl alcohol, 1- and 2-hexanol, 1- and 2-octanol, decyl alcohols, alkaryl alcohols such as p- nonyl phenol and alcoholic liquors such as fusel oil. Particularly useful alcohols include isopropanol, the primary butanols, primary pentanols, and primary and secondary hexanols. Concentrations within the range of from about 0.01% to about 20% or more by volume of cosurfactant are useful in the micellar dispersion and more preferably from about 0.1 to about 5.0%. Mixtures of two or more cosurfactants are useful.

Electrolytes: Examples of electrolytes include inorganic bases, inorganic acids, inorganic salts, organic bases, organic acids, and organic salts which are strongly or weakly ionized. Preferably, the electrolytes are inorganic bases, inorganic acids, and inorganic salts, e.g., sodium hydroxide, sodium chloride, sodium sulfate, hydrochloric acid, sulfuric acid, and sodium nitrate. Examples of other useful electrolytes can be found in U.S. Pat. No. 3,330,343. The type and concentration of electrolyte will depend on the aqueous medium, surfactant, cosurfactant, and hydrocarbon. Generally from about 0.1% to about 4% or more by weight of electrolyte is useful, percents based on aqueous medium. The electrolyte can be the salts within brackish or brine water.

Bases: pH adjustment can be achieved by adding bases, e.g., $NH_4OH$, $NaOH$, $KOH$, $Na_2CO_3$ to the micellar system as described above until the desired pH is attained.

Temperature: In general, the temperature at which the micellar system is to be utilized, i.e., the temperature prevailing in the actual formation, should be used as the reference point to which the formulation should be designed and conductivities, etc. should be measured at or near that temperature. Stability of the micellar system at ambient temperatures expected to occur during the injection operation should, of course, also be tested. However, the thermal stability of the compositions employed with the invention has been found to be generally excellent.

Formulation of the Micellar System: Micellar systems can be prepared according to the techniques of the aforementioned prior art. In general, preferred micellar systems will contain about 2-20 weight percent surfactants, about 5-70 percent hydrocarbon, about 10-60 percent electrolyte solution in water, and about 0.5-5 percent cosurfactant.

More preferred formulations will contain 5-15 percent surfactant, 20-60 percent hydrocarbon, 20-50 percent electrolyte solution in water, and about 1-3.5 percent cosurfactant. More preferred micellar systems will contain from about 5-12 percent surfactant, about 30-55 percent hydrocarbon, about 25-60 percent electrolyte in water, and about 1.5-3.5 percent cosurfactant.

Other Techniques: Size of the micellar dispersion slug useful with this invention is from about 1 percent to about 20 percent formation pore volume. Larger pore volumes are useful but may be economically unattractive. More preferably, from about 2 percent to about 10 percent formation pore volumes are useful and from about 3 percent to about 6 percent formation pore volumes give very efficient results.

In general, the techniques of recovery of petroleum by displacement, including substantially all of those taught in the above-described prior art, are applicable to the present invention.

EXAMPLES

The surface potential of the reservoir rock is measured in a salt solution, and the change in surface potential measured as the pH of the salt solution is changed from ~ pH 2 through pH 12. The salt used was either sodium chloride (NaCl) or sodium sulfate ($Na_2$-$SO_4$). The experimental method used to measure surface potential was either electroosmosis (zeta potential) or potentiometric (acid/base) titration. Electroosmosis is described in detail in Potter, E. C. "Electrochemistry", Cleaver-Hume Press, Ltd., London (1961). Potentiometric titration is described by Parks, G. A., Chem. Rev., 65, 177 (1965). Examples of the surface potential data are shown in FIG. 2.

Following the above experiments, which characterize the general response of the reservoir rock to solution and pH changes, the surface potential of the rock is measured using produced fluids from the reservoir. This information tells one the natural surface potential of the reservoir material (before contact with the micellar system) and when combined with the above general information, will enable one to predict how changes in the solution salt content and pH will change said surface potential (upon contact with the micellar system).

This type of information enables one to control adsorption at the rock, and, more specifically, to minimize sulfonate adsorption from micellar systems. Table 1 shows how changing the pH of several micellar systems affects sulfonate adsorption. When the pH is increased from 5 to 10 the sulfonate adsorption was decreased in each case. Recalling that the surface potential of the rock samples in FIG. 2 all decrease (became less positive or more negative) when the solution pH was changed from 5 to 10, one readily appreciates a decrease in the adsorption potential between a more negative (less positive) rock surface and a negative ionic species in solution.

FIG. 1 shows the effect of pH on the adsorption of sulfonate ions, onto alumina, from an aqueous solution. Standard adsorption techniques were used in this experiment, with the sulfonate analysis being done by the Methylene Blue method*. FIG. 2 shows the surface potential $\sigma_0$ as a function of pH for several sandstone materials. Berea sandstone is an outcrop material used to simulate reservoir rock. It is used in two forms, fired and unfired. The Fired Berea Sandstone (FBS) was subjected to a special heat treatment to inactivate clay particles. The Unfired Berea

*Jones, J. H., J. Assoc. Agr. Chemist, 28 398–409 (1945). Sandstone (UBS) is tested as received from the quarry. The Henry Sandstone (HS) is a reservoir rock material from near Robinson, Illinois. The Tensleep Sandstone (TS) is from the Tensleep reservoir in Wyoming.

TABLE 1

| Example | Cosurfactant | % Cosurfactant | pH | Adsorption Moles/Gram of Absorbent × $10^4$ |
|---|---|---|---|---|
| 1 | hexanol | .8 | 5 | 8.0 × $10^{-6}$ |
| 2* | hexanol | .8 | 10 | 1.7 × $10^{-6}$ |
| 3 | hexanol | 1.7 | 5 | 38.1 × $10^{-6}$ |
| 4* | hexanol | 1.7 | 10 | 22.4 × $10^{-6}$ |
| 5 | I.P.A. | .8 | 5 | 2.0 × $10^{-6}$ |
| 6* | I.P.A. | .8 | 10 | 0.5 × $10^{-6}$ |

*Invention

Modifications of the Invention

Modifications obvious to those skilled in the art from reading the specification are to be included within the scope of the claims.

What is claimed is:

1. In a process for reducing surfactant adsorption onto rock during oil recovery operations, the steps comprising contacting the rock with a micellar dispersion which interacts on contact with the rock to render the surface potential on the rock more negative.

2. A process according to claim 1 wherein said micellar systems have an electrical conductivity of at least about $1 \times 10^{-5}$ ohm$^{-1}$/cm$^{-1}$.

3. A process according to claim 1 comprising measuring the surface potential of the reservoir in combination with fluids produced from that reservoir and formulating said micellar system utilizing hydrocarbons, water, surfactants and cosurfactants which are selected to produce a more negative surface potential in combination with said rock than the surface potential produced with said produced fluids in combination with said rock.

4. A process according to claim 3 wherein both the type and the quantities of said constituents of said micellar system are varied so as to approach the maximum negative value for said surface potential in combination with said rock.

5. A process according to claim 1 wherein said micellar system has a pH of at least about 9.

6. A process according to claim 1 wherein said micellar systems comprise hydrocarbons selected from the group consisting of crude oil, partially refined fractions of crude oil, refined fractions thereof, liquefied petroleum gases and mixtures of the foregoing.

7. A process according to claim 1 wherein said micellar systems comprise cosurfactants selected from the group consisting of alcohols, amino compounds, esters, aldehydes and ketones containing from about 1 to about 20 carbon atoms.

8. A process according to claim 1 wherein said micellar systems comprise electrolytes selected from the group consisting of inorganic bases, inorganic acids, inorganic salts, organic bases, organic acids, and organic salts which are strongly or weakly ionized.

9. A process according to claim 1 wherein pH adjustment is achieved by adding bases selected from the group consisting of NaOH, NH$_4$OH, KOH, Na$_2$CO$_3$, and mixtures of the foregoing.

10. The process of claim 1 wherein the rock is an oil-bearing reservoir rock of predetermined surface potential.

11. The process according to claim 1 wherein said micellar system comprises petroleum sulfonate.

* * * * *

UNITED STATES PATENT OFFICE
CERTIFICATE OF CORRECTION

Patent No. 3,971,439  Dated July 27, 1976

Inventor(s) LARRY J. DOUGLAS

It is certified that error appears in the above-identified patent and that said Letters Patent are hereby corrected as shown below:

Col. 4, line 44  "The Unfired Berea Sandstone (UBS) is tested as received from the quarry. The Henry Sandstone (HS) is a reservoir rock material from near Robinson, Illinois. The Tensleep Sandstone (TS) is from the Tensleep reservoir in Wyoming."

should all be part of the text.

Col. 4, line 45  The footnote should be "*Jones, J.H., J. Assoc., Agr. Chemist, 28 398-409 (1945)" only.

Signed and Sealed this

Fifteenth Day of May 1979

[SEAL]

Attest:

RUTH C. MASON
Attesting Officer

DONALD W. BANNER
Commissioner of Patents and Trademarks